May 6, 1941. K. E. B. STENBERG 2,241,044
CONDIMENT HOLDER
Original Filed Dec. 27, 1935
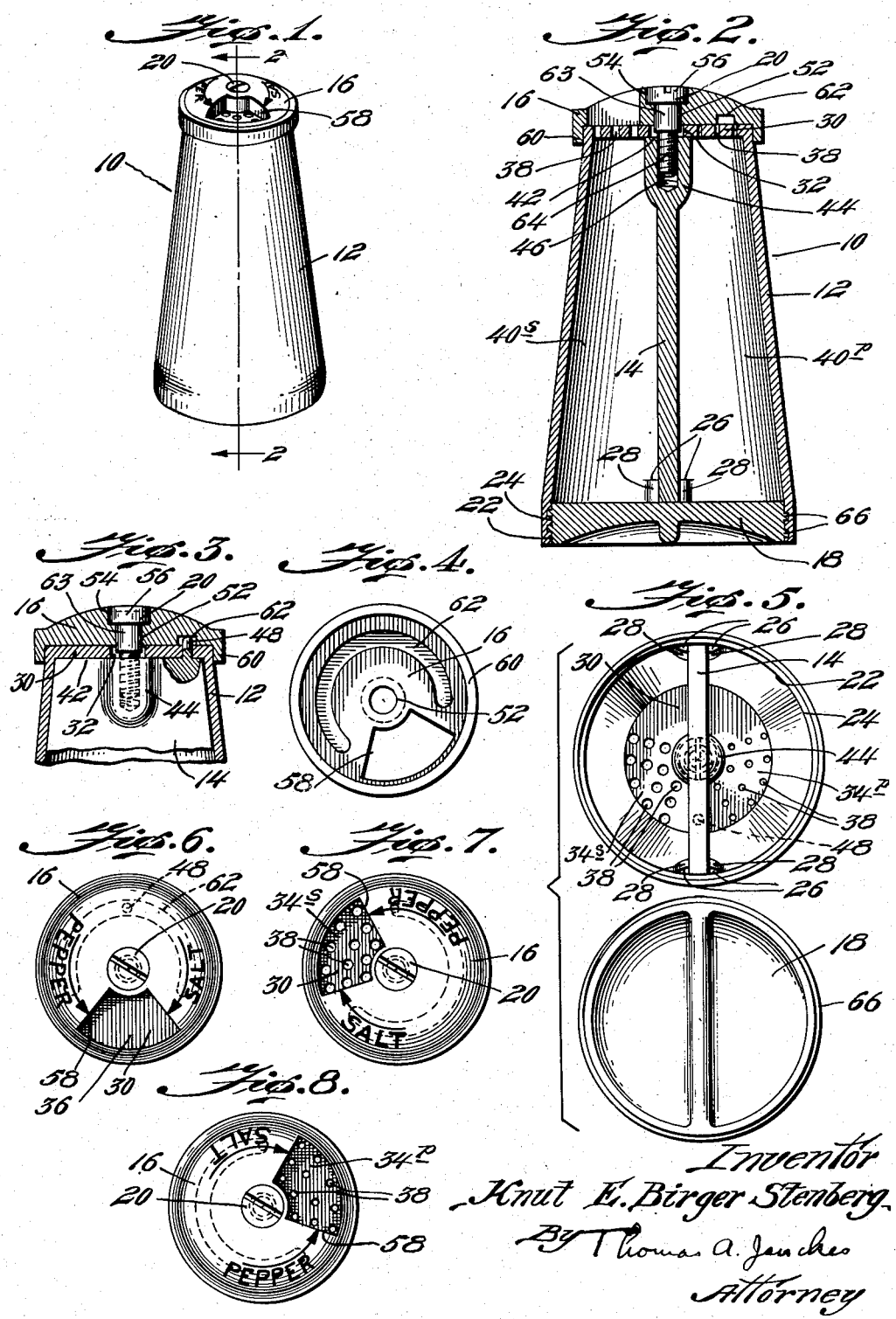

Patented May 6, 1941

2,241,044

UNITED STATES PATENT OFFICE 2,241,044

CONDIMENT HOLDER

Knut E. Birger Stenberg, Attleboro, Mass., assignor to Associated Attleboro Manufacturers, Inc., Attleboro, Mass., a corporation of Massachusetts Application December 27, 1935, Serial No. 56,353
Renewed September 15, 1939

6 Claims. (Cl. 65—45)

My invention relates to improvements in condiment holders particularly of a type having partition means dividing the condiment member thereof into a plurality of compartments, one for each species of condiment contained therein.

An object of my invention is to provide a condiment holder for holding a plurality of condiments of the approximate size of former types for holding a single condiment so that it may not only provide a neat and compact condiment holder, but also one which may be packed in a very small compass, such as for use in traveling by aeroplanes, automobiles, etc.

A further object of my invention is to provide such a condiment holder constructed of a light and attractive appearing molded composition material so that the condiment holder particularly when used in aeroplanes will carry a small amount of transportation weight.

A further object of my invention is to provide such a condiment holder constructed of a minimum number of simple operative parts which may be readily molded and assembled and particularly one in which no manipulating parts protrude from the body thereof to permit its being packed in small compass without automatically coming open in transportation.

A further object of my invention is to provide a condiment holder constructed of a minimum number of relatively small parts, but in which due to its inherent construction the cap or closure member thereof may be moved to an intermediate nondispensing position as well as to respective dispensing positions permitting the discharge of condiment from a selected compartment.

These and such other objects of my invention as may hereinafter appear will be best understood from a description of an embodiment thereof, such as is shown in the accompanying drawing.

In the drawing, Fig. 1 is a perspective view of a condiment holder constructed in accordance with my invention.

Fig. 2 is a vertical sectional view thereof taken along the line 2—2 of Fig. 1.

Fig. 3 is a vertical sectional view taken through the top portion thereof substantially adjacent the partition and showing a portion of the partition in section to additionally show the means I preferably employ for limiting the relative movement between the container and cap closure member.

Fig. 4 is a reverse plan view of the cap member of my invention removed.

Fig. 5 is a reverse plan view of my improved container with plug removed and showing adjacent thereto the plug in reverse plan.

Fig. 6 is a plan view of my improved condiment holder with the cap rotated to intermediate sealing position and showing in dotted lines the relative position of the cap rotation limiting means.

Fig. 7 is a plan view of my improved condiment holder similar to Fig. 6 with the cap moved to a position to dispense salt therefrom.

Fig. 8 is a plan view of my improved condiment holder similar to Fig. 6 with the cap moved to a position to dispense pepper therefrom.

In the drawing, wherein like characters of reference indicate like parts throughout, 10 generally indicates a condiment holder constructed in accordance with my invention.

My invention includes a container member 12, a separate partition member 14, a rotatable cap member 16 and a detachable plug 18 for the lower end of the container member and means to rotatably secure the cap to the upper end of the container member 12 and in my preferred embodiment to also secure the partition 14 within the container, in my preferred embodiment said means comprising a threaded bolt 20. Aside from the threaded bolt, I preferably construct each part of my invention of molded composition material, such as phenol or urea formaldehyde condensation product, cellulose acetate, Celluloid, glass, etc., so that the various parts thereof may compactly fit together and be of relatively light material for transportation purposes. The molded, preferably composition container member is preferably tubular and upwardly tapered as shown to provide a larger more solid base. It is also provided with the open lower end 22, in my preferred embodiment internally threaded as at 24 near the lower edge thereof. Said container member 12, in my preferred embodiment also has two sets 26 of two spaced aligning lugs 28 arranged substantially diametrically thereof above said internally threaded portion 24. Said container member 12 is also provided with a flat upper end 30. As stated I provide means to rotatably secure the dispensing cap member 16 of my invention to said flat upper end 30 and in my preferred embodiment said means includes the bolt 20 and the central hole 32 in said flat upper end 30 to receive said bolt 20. In the two compartment type of condiment holder 12 shown I preferably provide in the flat upper end 30 of said container member 12 two perforate dispensing portions 34$^s$ and 34$^p$ spaced to leave an imperforate dispensing portion 36 of greater width than the width of the perforate dispensing portions 34s and 34p between them and in my preferred embodiment to be over the respective compartments, said perforate dispensing portions 34s and 34p are spaced on opposite sides of said dimetrically opposite sets 26 of lugs 28. In the preferred embodiment shown, each perforate dispensing portion 34s and 34p preferably comprises a group of holes 38 grouped as shown in sector formation about said central hole 32.

To divide the container member into a separate salt compartment 40s and a separate pepper compartment 40p, I provide the partition member 14 which may be inserted inwardly from the open lower end 22 of the container member between each lug 28 of each set and urged upwardly until the upper end 42 thereof abuts the lower surface of the flat top wall 30 of the container member 12. It is thus obvious that when the partition member 14 is so inserted that it will divide the container 12 into two condiment compartments 40s and 40p each having a respective perforate dispensing portion 34s or 34p in the upper end thereof. Said partition member is also provided with an enlarged center portion 44 at the upper end thereof having the threaded hole 46 projecting downwardly therein to receive the lower end of the bolt 20 for rotatably securing the cap member 16 to said container 12 and simultaneously securing the partition member 14 against the top wall 30 of said container member. I also provide means to limit the rotative movement of the cap member 16 on the top wall of the container member 12 and for this purpose I provide a protuberance 48 projecting upwardly from the top wall 42 of said partition 14 spaced radially from said center portion in my preferred embodiment comprising the pin 48 molded with or threaded into a suitable hole in the partition wall.

The circular dispensing cap 16 is mounted over the upper end 30 of said container member 12 and is also provided with a central hole 52 for the reception of said bolt 20 therein and is provided with the enlarged seat 54 for the reception of the slotted head 56 of said bolt 20 therein. For dispensing purposes the cap member 16 is provided with a dispensing hole 58 of approximately the width of each spaced perforate portion 34s and 34p of each respective compartment 40s and 40p respectively rotatable to be in alignment with either of said dispensing portions or out of alignment with both for sealing purposes. The outer periphery of said cap member is preferably provided with the depending annular flange 60 to lie immediately adjacent the side wall of said container member 12 for air sealing purposes. To provide means on said cap member to cooperate with said protuberance 48 on said partition to limit the rotative movement of said dispensing hole 58, I provide the arcuate channel 62 in the lower surface thereof to receive said partition protuberance 48 to limit the rotative movement of said dispensing hole 58 from a dispensing position over the salt compartment, as shown in Fig. 7 to a dispensing position over the pepper compartment, as shown in Fig. 8 and to an intermediate sealing position over the imperforate portion 36, as shown in Fig. 6.

As stated hitherto, as the means to rotatably secure the cap member 16 to the top wall 30 of said container 12 I provide the threaded bolt 20. As stated, said bolt 20 is provided with a slotted head 56 adapted to be contained within the seat 54 therefor within said cap member. Immediately below said head the bolt is provided with a round bearing portion 63 extending loosely through and slightly below the cap hole 52. A lower portion 64 is provided below said bearing portion 63 adapted to threadedly engage the threaded center hole 46 in said threaded partition 14 to rotatably secure the cap member 16 to said container member 12 and as pointed out said partition 14 within the container 12. It is thus apparent that with this construction the threaded end 64 of the bolt may be adjustably secured within the threaded socket 46 to tightly secure the partition within the container and the cap 16 to the top of the container and yet permit frictional rotative movement thereof, the friction being varied in proportion to the amount that the threaded end 64 of the bolt 20 is threaded within the threaded hole 46 within said partition.

I also provide a detachable plug for the lower end 22 of said container member 12. While said plug may be detachably secured to plug up the lower end of said container and the lower ends of the respective compartments 40s and 40p, in my preferred embodiment, I provide said detachable plug 18 with a threaded outer edge 66 to threadedly engage the internally threaded portion 24 of the lower edge of the container and it is apparent that said plug may be screwed into the lower end of said container so that the upper surface thereof may abut the lower ends of said sets 26 of lugs 28 and the lower end of the partition 14 to seal the lower ends of the respective compartments 40s and 40p from each other.

While I preferably construct my improved condiment holder of tubular formation for compactness and ready manipulation thereof, it is obvious that if desired the particular shape thereof may be suitably varied.

It is apparent therefore that I have provided a novel type of multi-compartment condiment container of pleasing appearance, light in construction and of compact form to permit the ready transportation thereof with the other advantages set forth above.

It is understood that my invention is not limited to the specific embodiment shown and that various deviations may be made therefrom without departing from the spirit and scope of the appended claims.

What I claim is:

1. A condiment holder, comprising a molded composition, upwardly tapered tubular container member having an open lower end internally threaded near the lower edge thereof and two sets of two spaced aligning lugs arranged substantially diametrically thereof above said internally threaded portion and a flat upper end having a central hole and perforate dispensing portions therein spaced on opposite sides of said sets of lugs to leave an imperforate portion of greater width than the width of the perforate dispensing portions therebetween, each comprising a plurality of holes grouped in sector formation about said central hole, a partition contained diametrically of the interior of said container between the lugs of each aligning set to divide said container into two condiment compartments each having a perforate dispensing portion in the upper end thereof and having an enlarged center portion at the upper end thereof having a threaded hole therein and a protuberance projecting upwardly from the top thereof, a circular dispensing cap mounted over the upper end of said container member having a central hole having an enlarged seat near the upper end thereof, said dispensing cap being provided with a sector shaped dispensing hole of approximately the width of said spaced perforate dispensing portions of each compartment, respectively, rotatable to be in alignment with one or out of alignment with both, an annular flange depending from the outer periphery thereof to lie immediately adjacent the side wall of said container for air sealing purposes, and an arcuate channel in the lower wall thereof to receive said partition protuberance to limit the relative movement of said dispensing hole from a dispensing position over one compartment to a dispensing position over the other and permit of an intermediate sealing position, and a threaded bolt having a head adapted to lie in said cap seat, a rounded bearing portion extending through said cap hole and container top hole and a lower threaded portion adapted to threadedly engage the threaded hole in said partition to rotatably secure said cap to said container and said partition within said container and a detachable plug having a threaded outer edge to threadedly engage the internally threaded portion of the lower edge of said container to abut the lower ends of said sets of lugs and the partition to seal the respective compartments from each other.

2. A condiment holder, comprising a molded composition container member having an open lower end, and a flat upper end having perforate dispensing portions therein spaced to leave an imperforate portion of greater width than the width of the perforate dispensing portions therebetween, a partition contained within said container to divide said container into two condiment compartments each having a perforate dispensing portion in the upper end thereof, a protuberance projecting upwardly from the top thereof, a dispensing cap rotatably secured to the upper end of said container member having a dispensing hole of approximately the width of said spaced perforate dispensing portions of each compartment, respectively, rotatable to be in alignment with one or out of alignment with both, and an arcuate channel in the lower wall thereof to receive said partition protuberance to limit the relative movement of said dispensing cap, and a detachable plug for the lower end of the container to abut the partition to seal the respective compartments from each other.

3. A condiment holder, comprising a molded integral composition tubular container member having an open lower end and two sets of two spaced aligning lugs arranged substantially diametrically therein near the lower end thereof, and a flat upper end having a central hole and perforate dispensing portions therein spaced on opposite sides of said sets of lugs to leave an imperforate portion of greater width than the width of the perforate dispensing portions therebetween, a partition contained within the interior of said container between the lugs of each aligning set to divide said container into two condiment compartments each having a perforate dispensing portion in the upper end thereof and having an enlarged center portion at the upper end thereof having a threaded hole therein, a circular dispensing cap rotatably secured to the upper end of said container member having a central hole having an enlarged seat near the upper end thereof, a dispensing hole of approximately the width of said spaced perforate dispensing portions of each compartment respectively rotatable to be in alignment with one or out of alignment with both, and a threaded bolt having a head adapted to lie in said cap seat, a rounded bearing portion extending through said cap hole and container top hole and a lower threaded portion adapted to threadedly engage the threaded hole in said partition to rotatably secure said cap to said container and said partition within said container, and a detachable plug for the lower end of the container to abut the lower ends of said sets of lugs and partition to seal the respective compartments from each other.

4. A condiment holder, comprising a molded integral composition container member having an open lower end and a flat upper end having perforate dispensing portions therein spaced to leave an imperforate portion of greater width than the width of the perforate dispensing portions therebetween, a partition contained within said container to divide said container into two condiment compartments each having a perforate dispensing portion in the upper end thereof and a protuberance projecting upwardly from the top wall thereof, a dispensing cap rotatably secured to the upper end of said container member having a dispensing hole of approximately the width of said spaced perforate dispensing portions of each compartment, respectively, and rotatable to be in alignment with one or out of alignment with both, and an arcuate channel in the lower wall thereof to receive said partition protuberance to limit the relative movement of said dispensing hole from a dispensing position over one compartment to a dispensing position over the other and permit of an intermediate sealing position, and a detachable plug for the lower end of the container to abut the partition to seal the respective compartments from each other.

5. A condiment holder, comprising a molded integral composition tubular container member having an open lower end and a substantially flat upper end having a central hole and perforate dispensing portions therein spaced to leave an imperforate portion of greater width than the width of the perforate dispensing portions therebetween, a partition extending diametrically of the interior of said container to divide said container into two condiment compartments each having a perforate dispensing portion in the upper end thereof and having an enlarged center portion having a threaded hole therein at the upper end thereof, a circular dispensing cap rotatably secured to the upper end of said container member having a central hole having an enlarged countersunk seat near the upper end thereof, a dispensing hole of approximately the width of said spaced perforate dispensing portions of each compartment respectively rotatable to be in alignment with one or out of alignment with both, and a threaded bolt having a head adapted to lie in said countersunk cap seat, a rounded bearing portion extending through said cap hole and container top hole and a lower threaded portion adapted to threadedly engage the threaded hole in said partition to rotatably secure said cap to said container and a detachable plug for the lower end of the container to abut the partition to seal the respective compartments from each other.

6. A condiment holder, comprising a molded integral composition tubular container member having an open lower end and a substantially flat upper end having a central hole and perforate dispensing portions therein spaced to leave an imperforate portion of greater width than the width of the perforate dispensing portions therebetween, a partition extending diametrically of the interior of said container to divide said container into two condiment compartments each having a perforate dispensing portion in the upper end thereof and having a threaded hole therein at the upper end thereof, a circular dispensing cap rotatably secured to the upper end of said container member having a central hole having an enlarged countersunk seat near the upper end thereof, a dispensing hole of approximately the width of said spaced perforate dispensing portions of each compartment respectively rotatable to be in alignment with one or out of alignment with both, and a threaded bolt having a head adapted to lie in said countersunk cap seat, a rounded bearing portion extending through said cap hole and container top hole and a lower threaded portion adapted to threadedly engage the threaded hole in said partition to rotatably secure said cap to said container and a detachable plug for the lower end of the container to abut the partition to seal the respective compartments from each other.

KNUT E. BIRGER STENBERG.